April 9, 1946.   E. R. BRAY   2,397,916
FISHING LINE RETRIEVER
Filed March 12, 1944    2 Sheets-Sheet 1
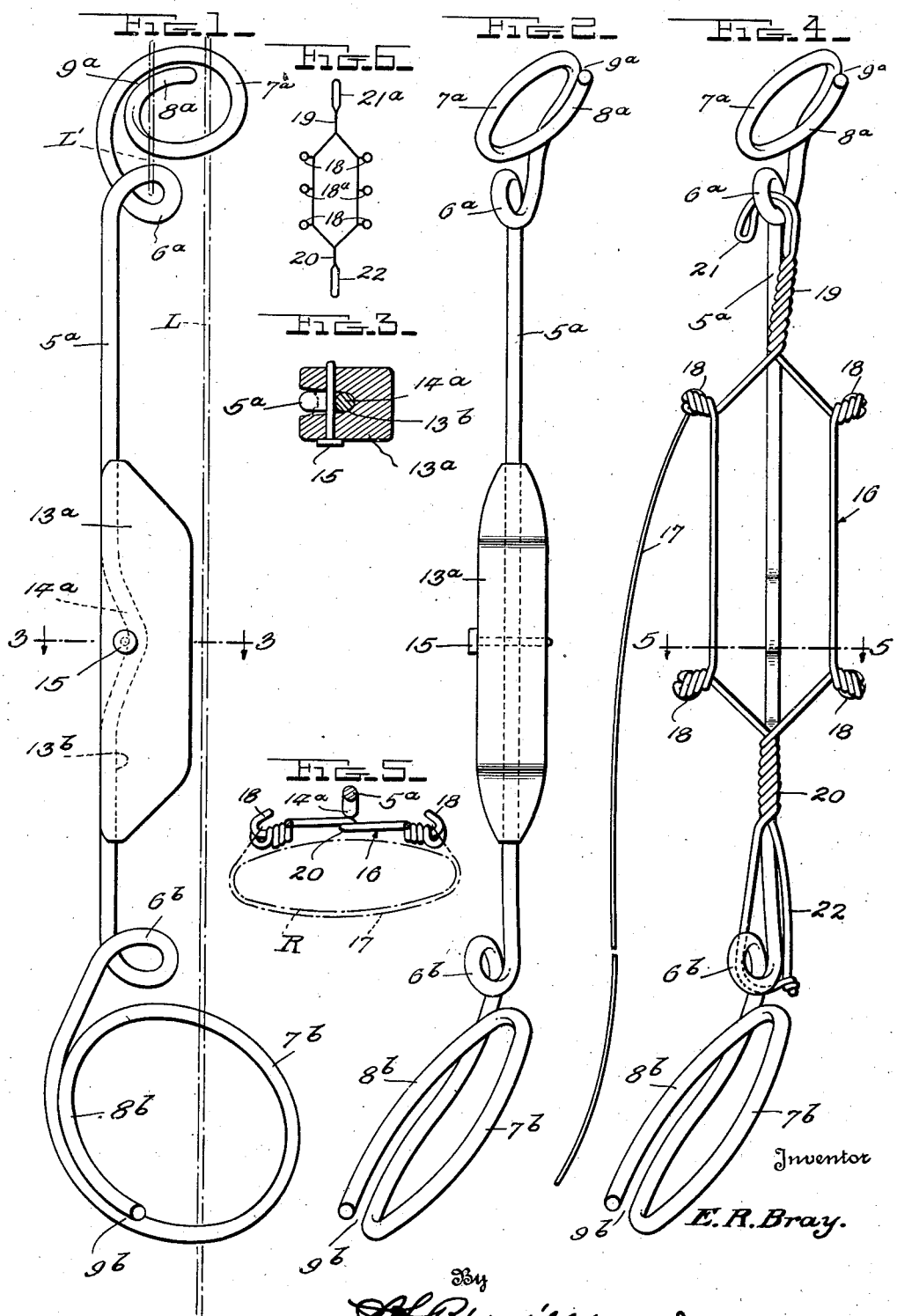
Inventor
E. R. Bray.
By H. B. Willson & Co. Attorneys

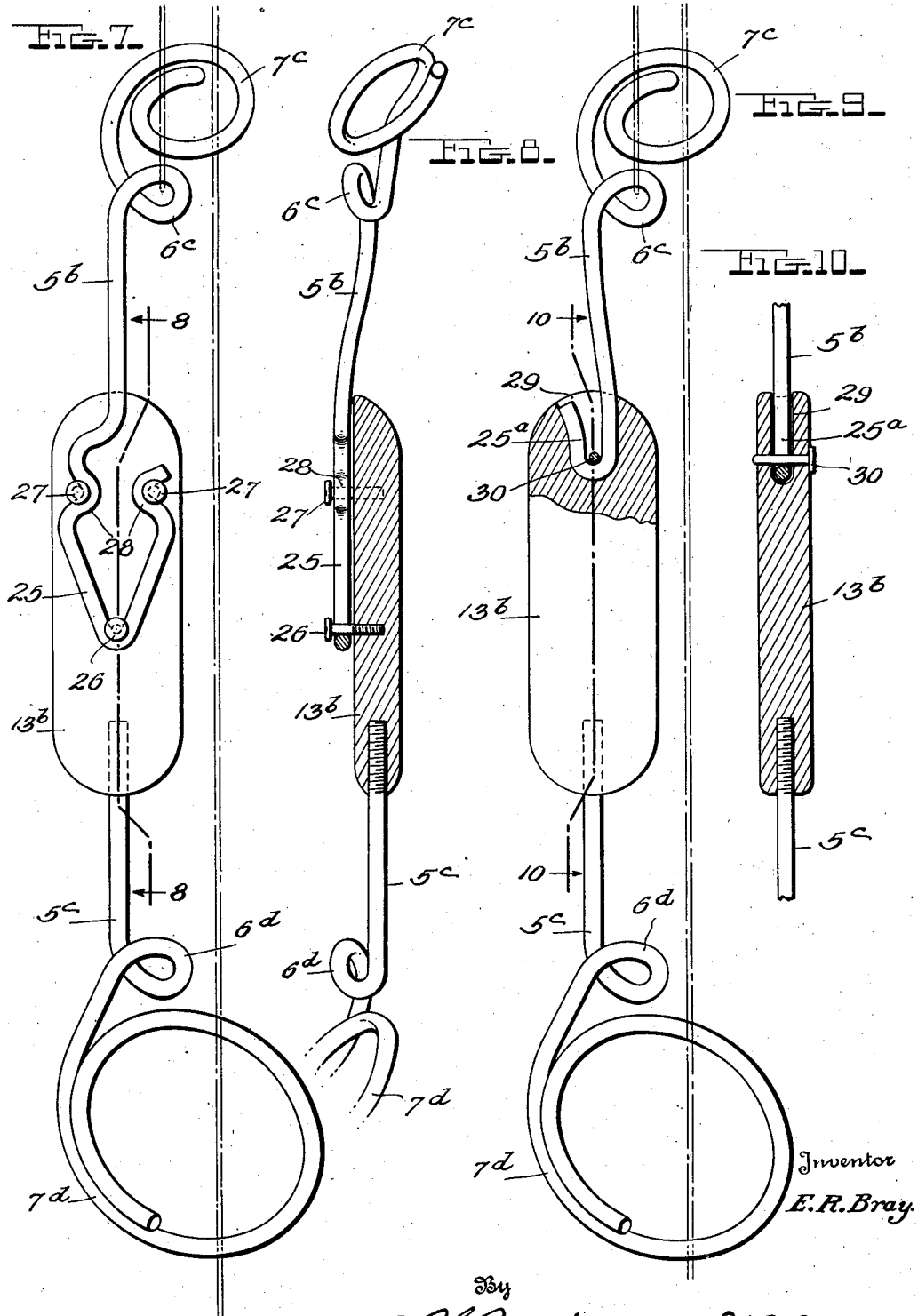

Patented Apr. 9, 1946

2,397,916

UNITED STATES PATENT OFFICE 2,397,916

FISHING LINE RETRIEVER

Elwyn R. Bray, St. Paul, Minn.

Application May 12, 1944, Serial No. 535,281
In Canada May 20, 1943

10 Claims. (Cl. 43—30)

The invention relates to a new and improved device to slide down a fishing line which has become snagged in rocks, roots, or the like, to loosen the snagged hook or hooks, and said invention is an improvement over my U. S. Patent 2,316,500, of April 13, 1943.

One object of the invention is to provide an improved construction which will be less liable to catch on roots and the like and may be lowered into narrower crevices.

Another object is to provide an improved construction which will remain on the line of snagged hook no matter how many positions it must take during operation.

A further object is to provide the device with a detachable weight which may be left behind when it is necessary to lighten weight as much as possible due to long portages to be encountered on the trip, novel means being provided, however, to permit easy fastening of a rock to the device, when the destination is reached, to act as a substitute for the aforesaid detached weight.

A still further object is to provide another form of construction in which one end of the device may be detached and the rest used as an emergency hammer, or as a club for subduing large fish.

Yet another object is to provide a device of exceptionally simple and inexpensive form, yet one which will efficient to a high degree.

With the foregoing in view, the invention resides in the novel subject matter hereinafter described and claimed, description being accomplished by reference to the accompanying drawings.

Figure 1 is a side elevation.

Fig. 2 is an edge view.

Fig. 3 is a cross sectional view on line 3—3 of Fig. 1.

Fig. 4 is an edge view with the weight removed and the rock-holding frame applied.

Fig. 5 is a cross sectional view on the line 5—5 of Fig. 4 showing in broken lines a rock lashed to the frame to serve as a weight.

Fig. 6 is a diagram showing a slightly different form of the rock-holding frame of Figs. 4 and 5.

Fig. 7 is a side elevation showing a different form of construction in which the shaft is in two sections, one secured to the weight and the other detachably connected with said weight Fig. 8 is an edge view partly in section as indicated by line 8—8 of Fig. 7.

Fig. 9 is a view similar to Fig. 7, partly in section, showing a further variation.

Fig. 10 is a detail section on line 10—10 of Fig. 9.

In the embodiment of the invention shown in Figs. 1 to 6, a stiff wire shaft $5^a$ has at one end a small loop or eye $6^a$ and a larger loop $7^a$, and at its other end a small loop or eye $6^b$ and a still larger loop $7^b$, and the small loops $6^a$ and $6^b$ are turned inwardly and positioned approximately in line with the large loops $7^a$ and $7^b$. This change over the patent above mentioned permits the device to more readily enter a narrow crevice in which the fish hook or lure may be caught. The latter operation is also facilitated by the planes of the large loops being disposed at sharply acute angles to the length of the shaft. The ends $8^a$ and $8^b$ of the wire are extended in the generally circular direction of the large loops $7^a$ and $7^b$ respectively to overlap portions of these loops and leave entrance throats $9^a$ and $9^b$ for the fishing line. These final bends $8^a$ and $8^b$ when positioned as shown in the drawings, prevent the snagged line L from leaving the loops $7^a$ and $7^b$ even though the retriever is tumbled upside-down or in any other direction in manipulating the retriever supporting line L' and the fishing line.

A weight $13^a$ is detachably mounted on the shaft $5^a$ by forming it with a longitudinal channel $13^b$ to receive the shaft and inserting a friction pin, cotter pin or the like $15$ in a transverse aperture formed in the weight. The shaft is formed with a slight bend $14^a$ in which the pin is seated so that the weight cannot rotate or slide on the shaft. By making the weight readily detachable, it may be removed when one wishes to eliminate all the weight possible in taking a trip where there are long portages. In such event, the weight is left at home and a wire rock-holding frame $16$ and a short piece of light wire $17$ (or cord) are taken along. The frame or holder $16$ is preferably made from suitable wire which is bent and twisted as shown in Figs. 4 and 5 to provide a wide central portion of substantially rectangular shape having eyes or hooks $18$ at its four corners and two shank or stem portions $19$ and $20$ extending from its ends. In Fig. 6, the frame is also provided with additional loops or hooks $18^a$ and in fact any desired number of such loops or hooks may be employed. The stem $19$ is formed with a hook $21$ (Fig. 4) or a loop $21^a$ (Fig. 6) adapted to engage with either of the loops or eyes $6^a$, $6^b$, while stem $20$ is formed with a loop $22$ adapted to be sprung over the other loop or eye as shown in Fig. 4. When the holder is thus applied to the shaft, a rock R of the proper size picked up at the shore of a lake or river after a portage has been made, is placed against frame 16 as shown in Fig. 5 and the wire or cord 17 is wound around the rock and engaged with the hooks or loops 18 (or 18 and 18a) to securely fasten the rock in position. The wiring or other lashing of the rock, if carried out diagonally of the frame in the form of an X tends to shorten said frame and hold the parts 21, 22 (or 21a and 22) engaged with the small loops or eyes 6a and 6b. The rock when fastened, will be in substantially the same position as the weight 13a, and it will be noted that either weight will be nearly directly above the part of the large loop which loosens the snagged hook.

Due to the throats 9a and 9b, the loops 7a and 7b may be easily engaged with a snagged line L and allowed to slide down the same while attached to the drop line L'. When the device comes to rest, usually against the snagged hook, it is manipulated by means of said drop line L' to dislodge the hook. Due to the structural changes which the improved device embodies, there is practically no likelihood of it slipping from the line, or failing to enter in narrow crevices, or catching on roots and the like.

In Figs. 7 to 10, the shaft is in two sections 5b and 5c, the section 5c being threaded into or otherwise secured to the weight 13b while the section 5b is detachably connected with said weight. When section 5b is detached, the section 5c and weight 13b may be used as an emergency hammer, or as a club for subduing large fish.

In Figs. 7 and 8, the inner end of the shaft section 5b is bent to form a V-shaped resilient attaching member 25, the crotch of which engages a headed stud 26 projecting from one side of the weight 13b. The side arms of this attaching member are received between two additional headed studs 27 and are bent to form seats 28 to engage these studs.

In Figs. 9 and 10, the inner end of the shaft section 5b is bent to form a smaller U-shaped attaching member or loop 25a which is snugly received in a socket 29 in the weight and held detachably by means of a friction pin 30. The loops 7c and 7d and the eyes 6c and 6d are identical with those above described.

Excellent results are obtainable from the exact details shown and described and they are, therefore, preferably followed. However, within the scope of the invention as claimed, minor variations may be made.

I claim:

1. A fishing line retriever comprising a shaft, at least the end portions of which are formed of stiff wire, the intermediate portion of said shaft being weighted, the wire end portions of said shaft being bent to form one small loop and one relatively large loop, both projecting laterally in the same direction from said shaft, said large loops being of two different sizes and being adapted to surround and slide downwardly upon a snagged fishing line with either of said large loops disposed downwardly, the ends of the wire portions after forming said large loops being unidirectional with said large loops and spaced from portions of said large loops to allow engagement of these loops with the snagged line, said small loops being closed and providing means for connecting a drop-line with either end of said shaft.

2. A structure as specified in claim 1, in which the planes of the two large loops are at sharply acute angles to the length of the shaft.

3. A structure as specified in claim 1; said two small loops being disposed between the two large loops.

4. A structure as specified in claim 1; said weight being positioned in line with the two large loops.

5. A structure as specified in claim 1 in which an intermediate portion of the shaft is bent, the weight has a longitudinal channel to receive said intermediate bent portion of the shaft and a transverse pin is passed through the weight and engages said bend to detachably fasten the weight to the shaft.

6. In a fishing line retriever, a shaft having guide means to encircle a snagged line, said shaft being provided also with two lateral projections near its ends, and a rock-holding frame having attaching means at its opposite ends to engage said projections and attach said frame to said shaft, and tie anchoring projections on said frame to be engaged by a tie when the latter is used to lash a rock to said frame to act as a weight.

7. In a fishing line retriever, a shaft having guide means to encircle a snagged line, said shaft being divided into two end sections, a weight extending from one of said sections to the other, means securing one of said sections to said weight, and releasable means detachably connecting the other of said sections to said weight.

8. A structure as specified in claim 7; said releasable means comprising lateral headed studs on said weight and a bent inner resilient end on said other of said sections, said bent end having seats held detachably engaged with said headed studs by the resiliency of said bent ends.

9. In a fishing line retriever, a shaft having guide means to encircle a snagged line, said shaft being divided into two end sections, a weight extending from one of said sections to the other, means securing one of said sections to said weight, the inner end of the other of said sections being bent into V-shape and being resilient, one lateral headed stud on said weight being engaged by the crotch of said V and two additional lateral headed studs between which the arms of said V extend, said arms having seats engaging said additional studs.

10. A structure as specified in claim 7; said releasable means comprising a loop on the inner end of said other section received in a socket in said weight, and a pin extending through said weight and loop.

ELWYN R. BRAY.